Figure 1:
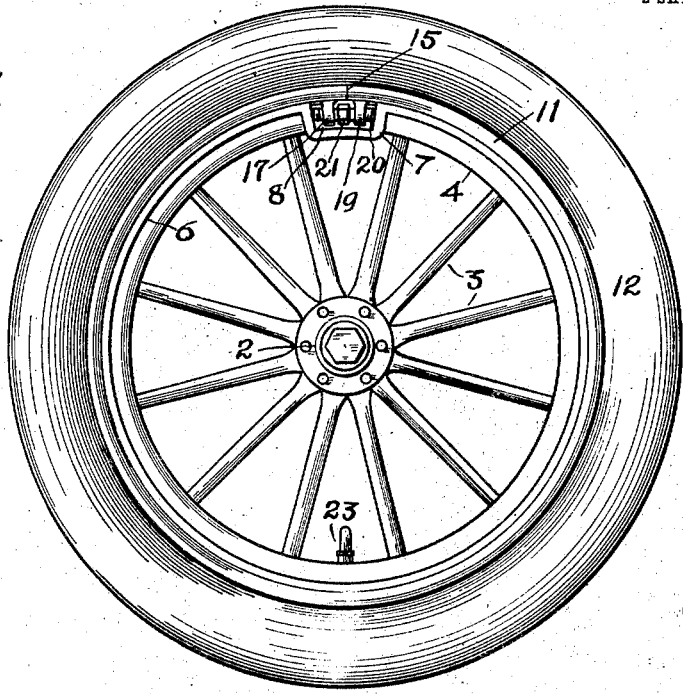

T. W. BROOMELL.
DETACHABLE WHEEL RIM.
APPLICATION FILED NOV. 28, 1908.

966,993.

Patented Aug. 9, 1910.
2 SHEETS—SHEET 1.

WITNESSES
Chas. H. Hughes,
R. L. Wallace.

INVENTOR
Thomas W. Broomell
BY Harry L. Wallace.
ATTORNEY

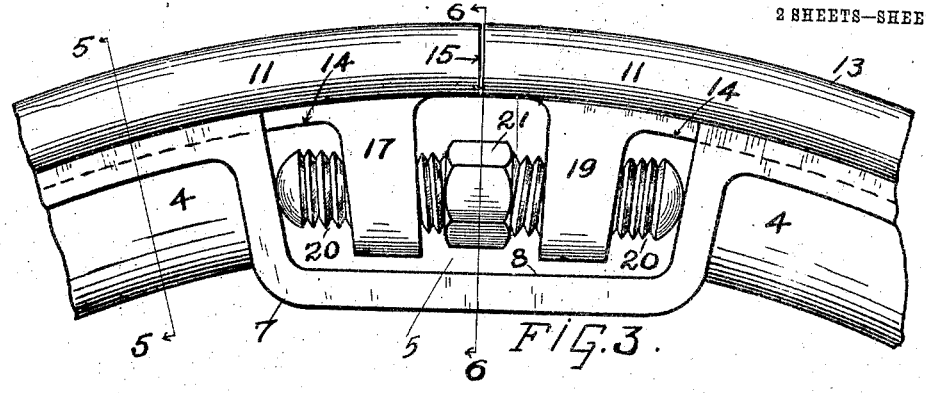
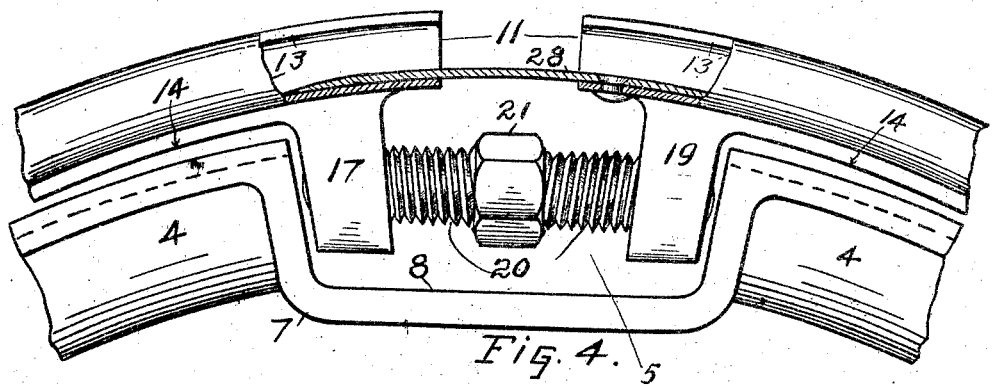
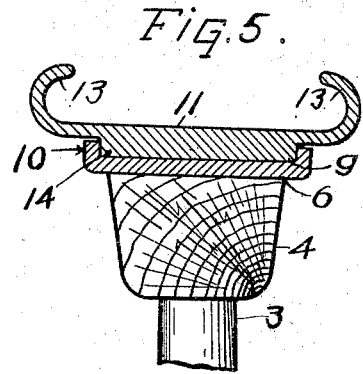
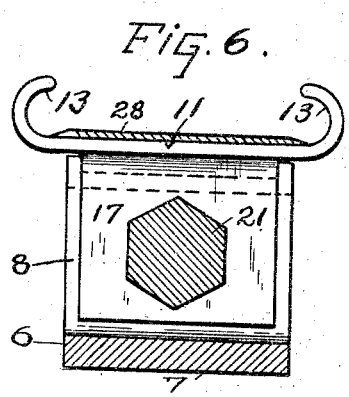

UNITED STATES PATENT OFFICE.

THOMAS W. BROOMELL, OF YORK, PENNSYLVANIA, ASSIGNOR OF ONE-THIRD TO GEORGE A. LICHTENBERGER AND ONE-THIRD TO CHARLES H. BEAR, BOTH OF YORK, PENNSYLVANIA.

DETACHABLE WHEEL-RIM.

966,993.      Specification of Letters Patent.      Patented Aug. 9, 1910.

Application filed November 28, 1908. Serial No. 464,952.

*To all whom it may concern:*

Be it known that I, THOMAS W. BROOMELL, a citizen of the United States, residing at York, in the county of York and State of Pennsylvania, have invented certain new and useful Improvements in Detachable Wheel-Rims, of which the following is a specification.

This invention relates to improvements in detachable rims, designed for use in connection with the wheels of pneumatic tired vehicles, and the invention relates particularly to rims for holding clencher tires, which are capable of being quickly applied to and detached from the wheels of automobiles and auto trucks, without requiring the removal of the tires from the rims.

The object of the invention is to provide a rim, to which the ordinary clencher tube or tire may be attached, and the two parts carried by a car, the same as extra tires are now carried, and capable of being quickly applied to or removed from a wheel, in case any of the tires give out, as by puncturing, blowing up, or from any other cause.

A further object is to provide a vehicle wheel of peculiar, yet simple construction, comprising few parts, which is arranged to receive and operatively hold the detachable rim. And a further object is to provide simple means for expanding, contracting and securing the detachable rim to a wheel without disturbing the tire.

The invention consists principally of a wheel, such as is commonly employed for automobiles and like vehicles, having a hub, spokes, and wooden felly, the felly having a section cut away to form a gap at one side of the wheel.

The invention further consists of a metallic hoop or band rigidly secured to the felly, so as to provide a strong and serviceable wheel; the hoop having a shallow groove extending around the periphery of the wheel, and also having an inwardly formed portion which fits and fills the gap in the felly, and which comprises an outwardly facing pocket or stirrup.

The invention further consists of a detachable clencher-rim, adapted to receive and hold the outer tube or shoe of a pneumatic tire, in which the inner tube is incased. The clencher-rim being cross-cut at a point corresponding to the center of the pocket in the hoop, the opposite ends of the rim being provided with like inwardly projecting lugs, which are disposed in the pocket, and the rim having a tongue formed around its inner circumference adapted to fit in the groove of the hoop. The object of cutting the rim is to permit the same to be expanded and contracted for the purpose of applying the rim with a tire attached to it and securing it in the peripheral groove of the wheel hoop, as well as for removing the rim from the groove after a tire has given out, it being a particular object of the present invention to permit the applying of the tire to the rim when the latter is detached from the wheel, and in this manner to provide an extra tire and rim combined to be carried on the automobile. And the invention further consists of simple means, preferably comprising a right and left threaded screw operatively connected to the lugs of the rim, by means of which the ends of the rim may be spaced apart or brought together for the purpose of applying the tire and rim to, or removing the said parts from, a wheel.

Other features and parts of the invention will be understood from the detail description which follows, and by reference to the accompanying drawings which form a part of this specification, and in which—

Figure 7:
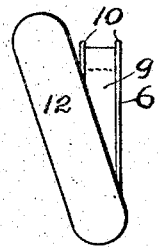
Figure 2:
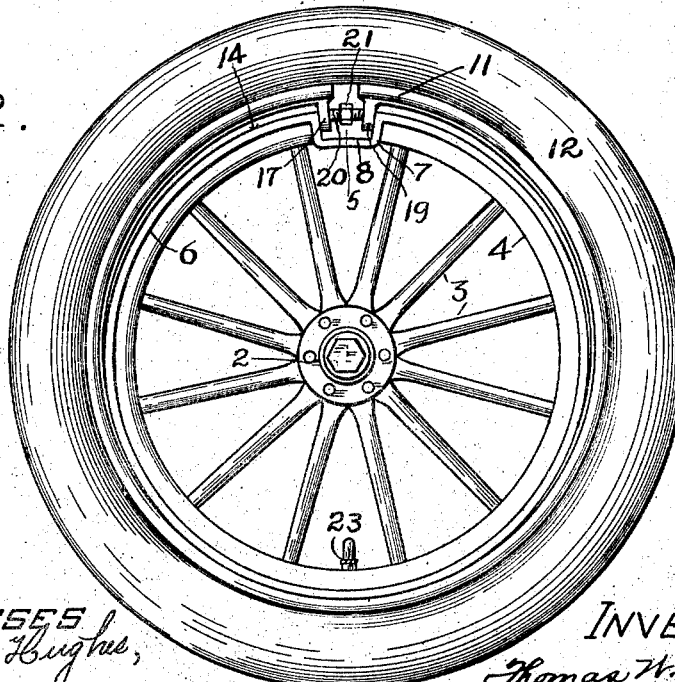

Figure 1 is a front side view of an auto wheel having my detachable rim applied, showing the rim contracted to hold the tire in place. Fig. 2 is a similar view, showing the rim and tire expanded, as when just applied, or as when ready to be detached from the wheel. Fig. 3 is an enlarged detail view of a portion of a wheel, with the rubber tire removed, showing the clencher-rim contracted, as illustrated in Fig. 1. Fig. 4 is a similar view, partly in section, showing the clencher-rim expanded by means of the right and left threaded bolt. Fig. 5 is a cross section, on line 5—5 of Fig. 3, showing the groove in the wheel hoop; also showing the corresponding tongue of the clencher rim fitted in the groove. Fig. 6 is a cross section on line 6—6 of Fig. 3, showing the location of the expanding bolt, and also one lug of the rim in their relation to the pocket in the hoop. Fig. 7 is a reduced diagrammatic view of a wheel, showing the manner of applying or removing a tire and rim after these parts have been expanded.

Similar characters of reference designate corresponding parts throughout the several views.

In the drawings, my wheel comprises a hub 2, a series of spokes 3, and a felly 4, the latter preferably made of wood, but may be made of other material, and all of these parts may be constructed and arranged like wheels commonly employed for automobiles and similar vehicles. In order to carry out the objects of the present invention, the felly 4 has a portion cut away between two of the spokes, as indicated in Figs. 1, 2, 3 and 4 for the purpose of forming a clear gap or opening. The wheel is next fitted with a hoop 6, which is preferably made of iron or steel, having an inwardly bent or depressed portion 7, which is fitted tightly in gap 5 of the felly. Hoop 6 is preferably shrunk on to the felly, the same as wagon tires are usually applied, so as to make the parts firm and unyielding. After hoop 6 has been secured to the felly, the bent portion 7 takes the place of the cut-away-portion of the felly, thus making the wheel at this point as strong as at any other. The stirrup 7 is provided to form a pocket or recess 8 extending through the wheel, the purpose of which will be explained below. The peripheral edge of hoop 6 is formed into a shallow groove 9, which lies between parallel flanges 10, as best seen in Figs. 5 and 7.

The detachable rim consists of a clencher-rim 11 preferably made of spring metal, arranged for holding an outer tube or shoe 12, which comprises a part of the well-known pneumatic tires; the shoe being held in place by the inturned hook-flanges 13. The inner circumference of the rim is formed into an integral tongue or angular rib 14, which corresponds to and is intended to snugly fit into the annular groove 9. Rim 11 is also cut or severed at a convenient point in the circle, as at 15 (see Figs. 1 and 3), for the purpose of rendering the rim expansible and contractible. Rim 11 is preferably provided near its opposite ends, with integral inwardly projecting lugs 17 and 19, each lug being perforated and tapped, one with right, and the other with left hand threads, to receive a correspondingly threaded bolt 20, which is employed for expanding and contracting the rim, as shown in Figs. 1, 2, 3 and 4. The bolt or screw 20 is preferably made to the full length of pocket 8, to prevent creeping or shifting of the rim after it has been applied to a wheel. Bolt 20 is provided centrally with a nut-like portion 21, preferably made hexagonal to receive a wrench, by means of which the bolt may be operated to either contract or expand the rim.

28 represents a flat piece of metal riveted to one end, and overlaps the opposite end of the rim, to prevent the inner tube (not shown) from blowing out when the rim is expanded, as shown in Figs. 2 and 4.

23 represents a tube for inflating the tire, which is preferably disposed at the opposite side of the wheel from the pocket 8, and passes through a hole (not shown) in the rim 11, and it also passes through suitable openings in the felly and hoop.

In practice, the rim should be removed from the wheel, the tire should be applied to the rim while the latter is contracted or closed up, and then the rim should be expanded ready to apply to the wheel. The tire may be inflated ready for use, either before or after the rim has been set in place on the wheel, but it is preferred to inflate the tire before the rim is applied, so that the power generated by the inflation of the tire together with the spring tension of the rim, may aid the screw in closing up the rim.

Fig. 1 illustrates a complete wheel equipped with pneumatic tire, and having my expansible clencher-rim applied. In this view, the rim is shown contracted by means of screw 20, and tongue 14 of the rim is tightly embedded in groove 9, which is the service position of the parts.

In Fig. 2 the rim 11 is shown expanded away from the hoop 6 at the top of the wheel by the operation of the screw 20 in the opposite direction.

When the rim is expanded as shown in Figs. 2 and 4, a clearance occurs at the upper side of the wheel, between the rim and flanges 10 of the hoop, and at such time the rim may be swung outwardly away from the body or tonneau of the car, as illustrated in Fig. 7. The rim should then be forced downward over the face of the wheel, in a manner to allow the filling tube 23 to be withdrawn from the hoop and felly without injury.

To apply the detachable rim, with the tire attached, to a wheel, the filling tube should first be inserted in the openings in the hoop and felly at the bottom of the wheel, and then the upper portion of the rim may be swung inwardly toward the vehicle until tongue 14 registers with groove 9. The rim should then be held in the last position until screw 20 is rotated in the direction to close up the gap in the rim. When the ends of the rim are brought together, as shown in Figs. 1 and 3, tongue 14 will be seated in groove 9, and the rim and tire will also be tightly clamped to the wheel ready for service, and they will be held in such position until the screw is operated in the reverse direction.

It will be seen from the foregoing description when read in connection with the drawings, that the present invention comprises an extremely simple, strong and practical device of the class, the essential features of which consists of a wheel having the gap 5 formed in the felly; the metallic hoop 6 rigidly secured to the periphery of the wheel; the hoop having the pocket or stirrup 7 disposed in the gap of the felly, and also having the peripheral groove 9 to receive the one-part expansible clencher-rim 11; the said rim adapted to receive and operatively hold the clencher tire 12, which may be applied to the rim and also inflated, while the latter is separated from the wheel.

Having thus described my invention what I claim as new and desire to secure by Letters Patent, is—

In a wheel, the combination of a felly having opposed square ends entirely separated by an intervening space which forms a gap extending radially throughout the thickness of the felly, a hoop surrounding and secured on the felly and having an inwardly depressed portion disposed longitudinally in said gap and extending radially throughout the thickness of the felly and also having the ends of said inwardly depressed portion arranged at right angles to the felly and abutting against the similarly arranged or square felly ends throughout the thickness of the felly, whereby said inwardly depressed portion virtually forms a segment of the felly, a split rim provided with means for holding it against lateral movement on the hoop and also provided with means for engaging a tire, oppositely-threaded lugs fixed to the end portions of the rim and disposed and movable toward and from each other in the said inwardly depressed portion of the hoop and longitudinally thereof, and a screw disposed longitudinally in said depressed portion and having oppositely-threaded portions engaging the threaded lugs of the rim.

In testimony whereof I affix my signature in presence of two witnesses.

THOMAS W. BROOMELL.

Witnesses:
E. S. CRANMER,
WM. J. WOODS.